| United States Patent [19] | [11] Patent Number: 4,711,946 |
|---|---|
| Jenekhe et al. | [45] Date of Patent: Dec. 8, 1987 |

[54] ELECTROACTIVE HETEROCYCLIC AROMATIC POLYMERS

[75] Inventors: Samson A. Jenekhe, Bloomington; Marcia K. Hansen, St. Louis Park, both of Minn.

[73] Assignee: Honeywell Inc., Minneapolis, Minn.

[21] Appl. No.: 904,747

[22] Filed: Sep. 8, 1986

[51] Int. Cl.$^4$ .................. C08G 16/02; H01B 1/00
[52] U.S. Cl. .................. 528/251; 528/246; 528/247; 528/249; 252/500
[58] Field of Search .............. 528/246, 247, 251, 249, 528/232; 252/500, 512, 518; 524/80, 401

[56] References Cited

U.S. PATENT DOCUMENTS

| 3,914,194 | 10/1975 | Smith .................. 528/251 |
| 4,204,216 | 5/1980 | Heeger et al. .................. 357/8 |
| 4,222,903 | 9/1980 | Heeger et al. .................. 252/518 |
| 4,229,510 | 10/1980 | Watarai et al. .................. 528/251 |
| 4,452,725 | 6/1984 | Wellinghoff et al. .................. 252/500 |
| 4,487,667 | 11/1984 | Traynor .................. 204/59 R |
| 4,490,509 | 12/1984 | Kossmehl et al. .................. 525/328 |
| 4,508,639 | 4/1985 | Camps et al. .................. 252/500 |
| 4,548,696 | 10/1985 | Weaver, Jr. .................. 204/290 |
| 4,548,738 | 10/1985 | Jenekhe et al. .................. 252/500 |
| 4,579,679 | 4/1986 | Papir .................. 252/518 |
| 4,579,896 | 7/1986 | Denisevich et al. .................. 252/518 |
| 4,620,943 | 11/1986 | Denisevich et al. .................. 252/518 |
| 4,624,999 | 11/1986 | Jenekhe .................. 528/248 |

OTHER PUBLICATIONS

Phenylene-Based Conducting Polymers; Handbook of Conducting Polymers, vol. 1, T. A. Skotheim et al.; 1986.
Electrochemical Preparation and Characterization of Conducting Polymers; Chemica Scripta 17; IBM Research Laboratory.
Band Structure of AlAs–GaAs(100) Superlattices; J. N. Schulman et al.; Physical Review Letters, vol. 39, No. 26.
The CdTe/HgTe Superlattice: Proposal for a New Infrared Material; J. N. Schulman et al.; Appl. Phys. Lett. 34(10), May 15, 1979.

*Primary Examiner*—Josephine L. Barr
*Attorney, Agent, or Firm*—C. G. Mersereau

[57] ABSTRACT

Electroactive organic polymeric materials of poly(-heterocycle diyl methylenes) containing alternating heterocyclic conjugated segments of varying sizes and methylene or substituted methylenes in the main chain and random copolymers of such poly(heterocycle diyl methylenes) together with a method of making them are disclosed.

44 Claims, 2 Drawing Figures

Fig. 1

|  | Eg (eV) | λ MAX (nm) | | | |
|---|---|---|---|---|---|
| x | | R = H | ⬡ | ⬡-R' | -(CH$_2$)$_5$-CH$_3$ |
| 1 | 1.9 | 372 | 480 | 516 | — |
| 2 | 1.53-1.55 | 500;400 | 670 | 692 | — |
| 3 | 1.20-1.24 | 860 | 870 | 857;650 | 800 |

Fig. 2

ELECTROACTIVE HETEROCYCLIC AROMATIC POLYMERS

BACKGROUND OF THE INVENTION

The Government has rights in this invention pursuant to a contract awarded by the Department of the Navy.

FIELD OF THE INVENTION

The present invention relates to electroactive organic polymers in general and, in particular, to electroactive polymers in which heterocyclic aromatic segments are incorporated into the polymer backbone. New polymers and copolymers containing five-membered aromatic heterocycles in the main chain together with methods of making are disclosed.

CROSS REFERENCE TO RELATED APPLICATIONS

Reference is made to application Ser. No. 904,746, entitled "Electroactive Polymers Having Aromatic and Quinonoid Bonding Structures," of S. A. Jenekhe, a co-inventor in the present application, which is filed of even date and assigned to the same assignee as the present application. That invention is concerned with electroactive polymers in which the backbone groups are selected from one or a combination of five- and six-membered rings which may or may not be heterocyclic but which are capable of aromatic and quinonoid bonding structures in the backbone. The polymers and copolymers of the present invention, on the other hand, contain five-membered aromatic heterocycles in the main chain and have a non-quinonoid bonding structure. A method of making the compounds of Ser. No. 904,746, first above, is contained in Ser. No. 904,748 of identical inventorship, ownership and filing date, and a method of making the polymers and copolymers of the present invention is the subject of Ser. No. 905,084, also of identical inventorship as the present application, even of filing date and assignee.

DESCRIPTION OF THE PRIOR ART

Electroactive polymers which exhibit semiconductive, conductive, electrochemical, electro-optical, or nonlinear optical properties are useful for applications in electronics, electro-optics, batteries, sensors, nonlinear optics or future molecular devices. Many electroactive polymers are currently known but the need and search for novel electroactive polymers of improved or novel properties for these various technological applications remains.

Electroactive polyacetylene, $(-CH\!=\!CH-)_m$, which can be polymerized into a film and doped p-type or n-type to a highly conductive state has been described in detail by Heeger et al in U.S. Pat. Nos. 4,204,216 and 4,222,903.

The aromatic polymer poly(p-phenylene), is also electroactive and can be treated with various electron acceptor or donor molecules to give highly conductive materials. Numerous derivatives of poly(p-phenylene) of the form are also known to be electroactive and dopable to conductive materials. The most important of these poly(p-phenylene) derivatives include poly(p-phenylene vinylene) when $X\!=\!CH\!=\!CH$ and poly(phenylene sulfide) when $X\!=\!S$. The preparation and properties of the various phenylene-based electroactive polymers are described in a review article "Phenylene-Based Conducting Polymers" by R. L. Elsenbaumer and L. W. Shacklette (in *Handbook of Conducting Polymers*, Vol. 1 T. A. Skotheim, ed., Marcell Dekker, 1986, pp. 213-263).

Electroactive polymers based on the five-membered ring, where $R_1$ and $R_2$ are hydrogen or alkyl, groups including polypyrroles ($X\!=\!N\!-\!H$), polythiophenes ($X\!=\!S$) and polyfurans ($X\!=\!O$) have been described by A. F. Diaz (*Chemica Scripta*, Vol. 17, pp. 145-148, 1981), G. Tourillon and F. Garnier (*J. Electroanal. Chem.* 135, pp. 173-178, 1982), Weaver et al in U.S. Pat. No. 4,548,696 and L. Traynor in U.S. Pat. No. 4,487,667. These electroactive five-membered ring polymers are generally prepared by electrolysis of the various heteroaromatic monomers, such as pyrrole, thiophene, furan and their derivatives as described by Diaz in the above reference. Copolymers of five-membered and six-membered rings of the formula where Ar is a phenylene group have been described by Camps et al in U.S. Pat. No. 4,508,639. A fused six-membered and five-membered ring system having the formula has been described by Wudl et al (*J. Organic Chem.*, Vol. 49, pp. 3382-3384, 1984).

Electroactive polycarbazoles of the formula (6)

have been described by Wellinghoff et al in U.S. Pat. No. 4,452,725. Derivatives of polycarbazoles having the formula (7)

where $R_2$ is a lower alkene group, have been disclosed by Jenekhe et al in U.S. Pat. No. 4,548,738.

All of the above prior art electroactive polymers exhibit some desired semiconducting, electrochemical or optical properties to various degrees. Similarly, they exhibit processibility to films and other desired shapes and stability in ambient conditions of temperature, air, moisture and pressure to varying degrees. For example, polyacetylene and poly(p-phenylene) are generally unstable in ambient air when doped to the highly conductive state but they exhibit the highest levels of conductivity (about 100-1000 ohm$^{-1}$cm$^{31\ 1}$) among currently known electroactive polymers. The polycarbazoles combine environmental stability with processibility but the levels of conductivity achievable are orders of magnitude lower than polyacetylene.

One of the most important parameters which govern the electroactivity of a polymer and its electronic, electrochemical, and optical properties is the semiconductor band gap ($E_g$) which is the energy gap separating the valence ($\pi$) and conduction ($\pi^*$) bands of the solid material, according to the electronic band theory of solids. A metallic solid material has a zero or near zero band gap; an intrinsically semiconducting material has a band gap which falls between about 0.2 and 2.0 eV. Materials with band gaps greater than about 2.0 eV are insulators. Most prior art electroactive polymers have band gaps, as determined from optical absorption, for example, greater than 2 eV which make them intrinsic insulators. Some prior art polymers that are intrinsic semiconductors are: polyacetylene, $E_g$, 1.5 eV; the polymer of formula 5 (polyisothianaphthene), $E_g$, 1.13 eV; and poly(2,5-thiophenediyl), the polymer of formula 3 with $R_1=R_2=H$ and $X=S$, $E_g$, 2 eV. On the other hand, poly(p-phenylene) of formula 1 and polypyrrole of formula 5 with $R_1=R_2=H$ and $X=N-H$ both have band gaps greater than 3 eV. When all these prior art electroactive polymers are doped, localized electronic levels attributed to solitons (in the case of polyacetylene only), polarons (radical ions) and bipolarons (di-ions, e.g., dications) are generally believed to be generated within the band gap. These localized electronic states effectively reduce the band gap as evidenced by new doping-induced optical absorption bands at photon energies below the intrinsic band gap ($E_g$). It is clear that the goal in the search for new electroactive polymers must be to achieve intrinsic semiconductors or metals without doping, which means to achieve a narrow band gap in polymeric materials. Also, it is desirable to be able to tune the band gap, and hence, intrinsic electronic, electrochemical and optical properties via molecular structures and synthetic process.

SUMMARY OF THE INVENTION

The present invention provides for new classes of organic polymeric materials which exhibit controllable band gaps, intrinsic electronic and optical properties and other electronic properties characteristic of insulators, semiconductors or conductors.

The basic organic compounds of the present invention may be represented by the polymers of the following Structures IA and IB:

(IA)

(IB)

where:
X or Y are selected from S, N—H, N—CH$_3$, N—Ph, O, Se or Te;

x or y are positive integers having a value from 1 to 5;

one or both of $Z_1$ and $Z_2$ are positive integers having a value from 1 and approximately 10,000;

n is a positive integer having a value from 2 to about 10,000;

$R_1$, $R_2$, $R_4$ and $R_5$ are selected from H, and lower alkyls CH$_3$... from about C$_1$ to C$_7$;

$R_3$ is any aliphatic, aromatic or heterocyclic group derivable from aldehydes of the formula R$_3$CHO. Some examples of $R_3$ are given below in which:

The organic homopolymeric materials of Structure IA are thus polymers of poly(heterocycle diyl methylenes). For example:

poly(2,5-thiophenediyl methylene), i.e. wherein $X=S$, $x=1$, $R_1=R_2=R_3=H$;

poly(3-methyl-2,5-thiophenediyl methylene) wherein $X=S$, $R_1=R_3=H$, $R_2=CH_3$ and $x=1$;

poly(2,5-thiophenediyl benzylidene) wherein $X=S$, $x=1$, $R_1=R_2=H$, $R_3=$phenyl;

poly(5,5',α-bithiophenediyl p-acetoxybenzylidene) wherein $X=S$, $x=2$, $R_1=R_2=H$, and $R_3=$p-acetoxyphenyl;

poly(2,5-pyrrolediyl benzylidene) wherein $X=N-H$, $x=1$, $R_1=R_2=H$ and $R_3=$phenyl; and poly(2,5 furandiyl benzylidene) wherein $X=O$, $x=1$, $R_1=R_2=H$ and $R_3=$phenyl, etc.

Similarly, the organic polymeric materials of Structure IB are random copolymers of poly(heterocycle diyl methylenes). For example, it includes compounds such as:

poly(3-methyl-2,5-thiophenediyl benzylidene-co-2,5-pyrrolediyl benzylidene) wherein $X=S$, $Y=N-H$, $x=y=1$, $R_1=H$, $R_2=CH_3$, $R_4=R_5=H$, $R_3=$phenyl and $Z_1$ and $Z_2$ are random numbers;

poly(5,5', α-bithiophenediyl methylene-co-2,5-thiophenediyl methylene) wherein $X=Y=S$, $x=2$, $y=1$, $R_1=R_2=R_3=R_4=R_5=H$, and $Z_1$ and $Z_2$ are random numbers.

The basic polymers and copolymers of the present invention represented in Structures IA and IB are synthesized by condensation polymerization of the aromatic five-membered heterocycles or their oligomers with aldehydes under acid catalysis. The polymers of Structure IA are prepared by reaction of a heteroaromatic monomer, dimer, or oligomer with an aldehyde ($R_3CHO$) under protonic acid catalysis in solution. To obtain copolymers of Structure IB two hetero-aromatic monomers, dimers or oligomers are reacted with an aldehyde ($R_3CHO$) under similar conditions. Thus, the side group $R_3$ in Structures IA and IB may be group derivable from any aldehyde used in the polymerization reaction. Optimum reaction conditions leading to high yields are obtained when the mole ratio of heterocycle(s) to aldehyde is 1.00 or less.

DETAILED DESCRIPTION OF THE INVENTION

The heterocyclic electroactive polymers and copolymers of Structures IA and IB include polymers containing thiophenes, furans and pyrroles including their dimers and oligomers thereof and other substituent groups in the heterocycle together with alternating methylene or substituted methylene groups ($-CR_3H-$) in the main chain were generally synthesized by treatment of the desired heterocycle or substituted heterocycle monomer, dimer or oligomer with the desired aldehyde of the form $R_3CHO$ in a condensation polymerization. The heterocyclic constituent was normally added to a solution of the aldehyde, typically in p-dioxane or N,N-dimethylformamide (DMF) acidified with concentrated sulfuric acid to catalyze the reaction. Any protonic acid can function as a catalyst by protonating the aldehyde: $H^+ + R_3CHO = R_3 + CHOH$.

Optimum polymerization conditions which form part of the basic process for making these electroactive polymers include reaction in inert atmosphere such as argon or nitrogen, ambient or near ambient atmospheric pressure and a reaction temperature in the range of 20°-200° C. A reaction time of a few hours to as much as several days is employed depending on the reaction temperature and the desired polymer properties, for example, degree of polymerization. The reaction is carried out in a compatible solvent which may be defined as any solvent or combination of solvents which is inert to, i.e. does not affect the reactants, dissolves the reactants and partially dissolves the polymer, for example, p-dioxane, DMF, acetic acid (HAC), dimethylacetamide (DMAC) and N-methyl-2-pyrrolidone (NMP). The polymer is recovered from the polymerization reaction mixture by precipitation into a non-solvent such as an alcohol or by evaporation of the solvent.

The aromatic rings of the five-membered heterocycles, thiophenes, pyrroles, furans, selenophenes and tellurophenes are strong $\pi$-electron donors, and hence generally undergo electrophilic substitution reactions selectively at the C-2 position under acid catalysis when the ring is not substituted as described by C. W. Bird and G. W. H. Cheeseman (in: "Comprehensive Heterocyclic Chemistry", A. R. Katritzky and C. W. Rees, eds., vol. 4, Pergamon Press, 1984.). Substitution at the 3 or 4 or both 3 and 4 positions directs the reaction to the C-2 or equivalent position exclusively and, consequently, linear polymers result.

Contemplated equivalents of the compounds of general Formulae IA and IB are compounds otherwise corresponding thereto and having the same general properties wherein one or more of $R_1-R_5$ are simple variations of the substituents as defined therein, e.g., wherein any of $R_1-R_5$ can be a substituted alkyl group. As will be apparent, where a substituent can be a hydrogen atom, the exact chemical nature of a substituent which is other than hydrogen at that position is not critical, so long as it does not adversely affect the overall spectrum of activity of the polymer.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. The compounds of the present invention are thus further illustrated by the following examples:

EXAMPLE 1

158.5 mL of p-dioxane (Eastman Kodak) followed by 13.35 mL of benzaldehyde (Baker) were placed into a 500 mL three-neck round bottom flask fitted with a condenser capped with a gas outlet, a mechanical stirrer, a thermometer and argon gas inlet under flowing argon atmosphere. Next, 2.22 mL of concentrated sulfuric acid ($H_2SO_4$) and 8.26 mL of pyrrole (Eastman Kodak) were added. The reaction temperature was maintained at 85° C. by thermostating the reaction vessel in an oil bath, and the stirrer was set to turn at 100 rpm. The polymerization reaction ran in flowing argon atmosphere for 48 hours after which the reaction mixture was poured into stirring methanol in a 2000 mL beaker. A brown polymer product was precipitated and recovered by suction filtration through a fitted glass funnel.

The polymer was dried in a vacuum oven at 35° C. The yield was about 95%. The polymer was identified as poly(2,5-pyrrolediyl benzylidene) represented by the structure:

EXAMPLE 2

The same procedure as in Example 1 was used except that 160.0 mL of dioxane, 3.929g (0.131 mole) of paraformaldehyde (Eastman Kodak) and 8.2 mL (0.118 mole) of pyrrole (Eastman Kodak) were used. After 20.5 hours of reaction at 85° C., the polymerization mixture was poured into methanol with stirring and recovered. The yield was 90%. The resulting polymer was reddish colored and identified as poly(2,5-pyrrolediyl methylene) whose structure is represented by:

EXAMPLE 3

Using the same procedures as in Example 1, a polymerization mixture was prepared with 126 mL of p-dioxane, 10.67 mL (0.1047 mole) of benzaldehyde (J. T. Baker), 1.80 mL (0.032 mole) of conc. $H_2SO_4$, and 7.50 mL (0.095 mole) of thiophene (Eastman Kodak). The polymerization reactor was thermostated in oil bath at 87° C. After 21 hours of reaction, a red polymer product was recovered using the procedures of Example 1. The polymer was identified as poly(2,5-thiophenediyl benzylidene) whose structure is represented by:

EXAMPLE 4

The same procedures as in Example 1 were used except that a 2000 mL round bottom reaction vessel, 506 mL of p-dioxane, 30.0 mL (0.380 mole) of thiophene, 42.60 mL (0.418 mole) of benzaldehyde, and 7.14 mL (0.128 mole) of conc. $H_2SO_4$ were used. The reaction temperature was 87° C. and the polymerization time was 71 hours. A red polymer identical in molecular structure to that of Example 3 was recovered.

EXAMPLE 5

A polymerization mixture consisting of 3.139 g (0.1045 mole) of paraformaldehyde, 133 mL of p-dioxane solvent, 1.78 mL (0.032 mole) of conc. $H_2SO_4$, and 7.50 mL (0.095 mole) of thiophene was prepared and reacted at 88° C. for 26 hours using the procedures of Example 1. A brownish-black polymer product containing brownish to metallic grey flakes was recovered and dried in a vacuum oven. The polymer was identified as poly(2,5-thiophenediyl methylene) whose structure is represented by:

EXAMPLE 6

A polymerization mixture was prepared and reacted according to the procedures of Example 1, using 122 mL p-dioxane, 15.826 g (0.1045 mole) p-nitrobenzaldehyde (Fairfield), 1.79 mL (0.032 mole) conc. $H_2SO_4$; 7.50 mL (0.095 mole) thiophene. The polymerization temperature and time were 85° C. and 26.5 hours, respectively. A reddish-black polymer was recovered with a yield of 90% and identified as poly(2,5-thiophenediyl p-nitrobenzylidene) whose structure is:

EXAMPLE 7

A polymerization mixture was prepared and reacted according to the procedures of Example 1, using 156.5 mL p-dioxane, 13.14 mL (0.129 mole) benzaldehyde, 2.17 mL (0.039 mole) conc. $H_2SO_4$, 8.50 mL (0.117 mole) furan (Mallinkrodt), 28° C. reaction temperature, and 24.0 hours reaction time. The bluish-black polymerization solution was poured into stirring methanol and no precipitate was obtained. The solvents were allowed to evaporate resulting in a bluish-black solid which was purified by dissolving in tetrahydrofuran (THF), adding methanol, allowing the solvents to evaporate and drying in a vacuum oven at 35° C. The yield was 25%. The bluish-black polymer was identified as poly(2,5-furandiyl benzylidene) whose structure is represented by:

EXAMPLE 8

A polymerization mixture was prepared and reacted according to the procedures of Example 1 using 114.5 mL p-dioxane, 8.53g (0.095 mole) methylthioacetaldehyde (Fairfield); 1.6 mL (0.029 mole) conc. $H_2SO_4$ (Mallinkrodt); 5.85 mL (0.086 mole) pyrrole (Eastman Kodak); reaction temperature =87° C.; reaction time=20.5 hrs. The reaction yield was greater than 96%. A reddish-black polymer was recovered and identified as poly (2,5-pyrrolediyl methylthioethylidene) having the following structure:

EXAMPLE 9

In this example, 7.50 mL (0.095 mole) of thiophene (Eastman Kodak) was added to a 500 mL round bottom flask followed by 120 mL of N,N-dimethylformamide. Next, 9.2 mL (0.097 mole) of crotonaldehyde (Eastman Kodak) was added followed by 0.89 mL (0.016 mole) of $H_2SO_4$ (Mallinkrodt). Finally, 6.5 mL of N,N-dimethylformamide was added. The temperature stabilized at 87° C. With an atmosphere of argon (99.999% pure) and a mechanical stirrer at 100 rpm, the reaction ran for 22.5 hours. An orange gelled polymer was recovered which has the following structure:

EXAMPLE 10

A polymerization mixture was prepared and reacted according to the procedures of Example 1, using a 1000 mL reactor: 74 mL p-dioxane; 5.41 mL (0.053 mole) benzaldehyde; 0.89 mL (0.016 mole) conc. $H_2SO_4$; 7.996 g (0.048 mole) 2,2'-bithiophene (Eastman Kodak); 85° C. reaction temperature; 21.5 hours reaction time. The green polymerization reaction solution was poured into stirring methanol in a 2000 mL beaker. A light green polymer was precipitated, recovered by suction filtration and dried in a vacuum oven at 35° C. The reaction yield was about 85%. The polymer was identified as poly(5,5',α-bithiophenediyl benzylidene), (PBTB), whose structure is represented by:

EXAMPLE 11

In this synthesis, 7.0 mL (0.050 mole) of p-acetoxybenzaldehyde (Fairfield) was added to 500 mL round bottom reaction flask and washed down with 51 mL of p-dioxane. Next, 0.89 mL (0.016 mole) of $H_2SO_4$, (Mallinkrodt) was added followed by 8.007 g (0.048 mole) of 2,2'-bithiophene (Eastman Kodak). Finally, 14.5 mL of p-dioxane was added. The temperature stabilized at 89° C. With an atmosphere of argon and a mechanical stirrer turning at 100 rpm, the reaction ran for 24 hrs. The reaction was quenched in 500 mL of MeOH. A blue precipitate was seen which quickly gelled. The polymer was re-dissolved in THF and 500 mL of MeOH were added. The solvents were allowed to evaporate and the polymer was dried in an oven under a vacuum at 30° C. A dark blue product giving a yield of 86% was obtained. The polymer poly(5,5',α-bithiophenediyl acetoxybenzylidene), (PBTAB), had the following structure:

EXAMPLE 12

The same procedure as in Example 11 was used except the 1.59 g (0.053 mole) of paraformaldehyde (Eastman Kodak) and 25 mL of p-dioxane were used. The acid and 2,2'-bithiophene were washed down with 64 mL of p-dioxane. The temperature stabilized at approximately 86° C. and the reaction ran for 19 hours. The polymer was recovered by first quenching the liquid portion into 500 mL of stirring MeOH. A yellowish-green polymer was recovered by performing a suction filtration and drying the product in an oven under a vacuum at 35° C. The yield was 100% of the polymer poly(5,5',α-bithiophenediylmethylene), (PBTM), having the following structure:

EXAMPLE 13

The procedure of Example 11 was followed except that 1.60 g (0.053 mole) of paraformaldehyde (Eastman Kodak) and 35 mL of p-dioxane were used. 30 mL of p-dioxane was added. The temperature stabilized at 85° C. The reaction ran for 6 hours. The polymer was quenched in 500 mL of MeOH and the yellowish product was recovered by suction filtration. The yield was greater than 65%.

EXAMPLE 14

Figure 2:
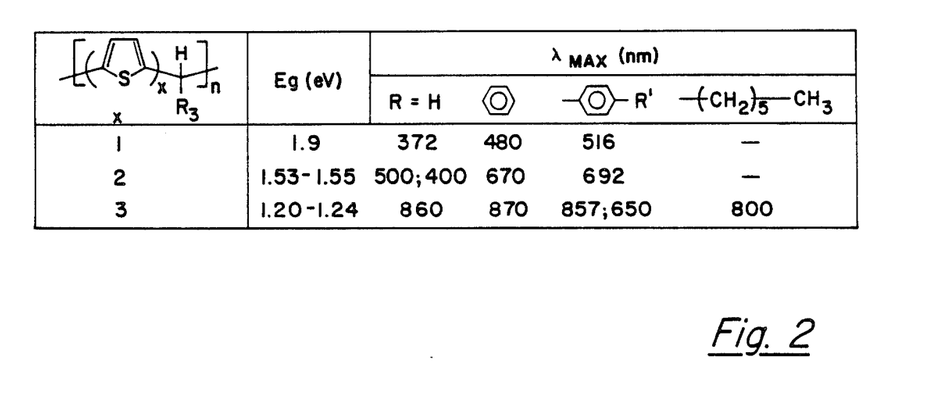
FIG. 2 shows the tunability of optical properties of certain of the polymers of the invention.

34 mL of p-dioxane was added to a 500 mL round bottom reaction flask. Next, 8.007 g (0.048 mole) of 2,2'-bithiophene (Eastman Kodak) was added and washed down with 30 mL of p-dioxane. Then, 4.6 mL (0.052 mole) of crotonaldehyde (Eastman Kodak) was added followed by 0.8 mL (0.014 mole) of H2SO4 (Mallinkrodt). Finally, 10 mL of p-dioxane was used to wash down the acid. With an atmosphere of argon (99.999% pure) and a mechanical stirrer turning at 100 rpm, the reaction proceeded for 18 hours at a temperature which stabilized at 82° C. The polymer was quenched in MeOH and recovered by suction filtration and dried under vacuum at 40° C. The polymer was made up of large dark pieces and a fine yellow portion. The yield was greater than 91% of theoretical. The polymer had the following structure:

Examples 10-14 illustrate representative linear soluble polybithiophenes containing 5,5',α-bithiophenediyl units separated by an sp$^3$ carbon atom (—CR$_3$H—) in the main chain. As shown in FIG. 2, the semiconductor or optical band gap ($E_g$) of these polymers is about 1.5-1.6 eV with the long wavelength absorption peak at 670-692 nm depending on the side group attached at the asymmetric bridge carbon atom (R$_3$). The polymers exhibit hyperconjugation through the bridge C—H bond as evidenced by their relatively large degree of π-electron delocalization or small band gap. It is suggested from the optical absorption results and initial investigation of solutions of the polymers in several solvents that they exist in planar chain conformations in solution and in the solid state. The novel polybithiophenes are excellent nonlinear optical materials as well as precursors to conjugated polymers containing alternating aromatic and quinonoid sequences. In view of the small band gaps (1.5-1.6 eV), the derivative electroactivity such as the electrochemical redox properties are ideal for various modified electrode applications.

EXAMPLE 15

3.99 g (0.016 mole) of α-terthiophene (SYNCOM$_{BV}$) was dissolved in 15 mL of p-dioxane, then the solution was added to a 500 mL round bottom reaction flask. 5 mL of p-dioxane (Eastman Kodak) was used to wash the monomer down. Next 2.7 mL (0.019 mole) of heptaldehyde (Eastman Kodak) was added followed by 5 mL of p-dioxane. 0.28 mL (0.005 mole) of H2SO4 (Mallinkrodt) was added and washed down with 5 mL of p-dioxane. This was reacted at a stabilized temperature of 86° C. in an argon atmosphere, while stirring, for 18 hours. The polymer immediately gelled into a green product upon quenching in 300 mL MeOH. After filtering with suction the polymer turned greenish to dark brown. The filtrate was yellow. The product poly(5,5'-',α-terthiophenediyl heptylidene) (PTTH) had the following structure:

EXAMPLE 16

4.0g (0.016 mole) of α-terthiophene (SYNCOM$_{BV}$) was dissolved in 23 mL of p-dioxane (Eastman Kodak) and added to a 500 mL round bottom reaction flask. Next, 3.104 g (0.019 mole) of p-acetamidobenzaldehyde (Eastman Kodak) was added and washed down with 15 mL of p-dioxane. Finally, 0.28 mL (0.005 mole) of H2SO4 (Mallinkrodt) was added. The mixture was reacted for 6 hours at a stabilized temperature of 88° C. in an argon atmosphere with mechanical stirring. A yellow-green colored product was recovered in 500 mL MeOH. A suction filtration was done and the polymer allowed to air dry over night. The yield was greater than 51%. The product poly(5,5'',α-terthiophenediyl p-acetamidobenzylidene) (PTTAAB) had the following structure:

EXAMPLE 17

4.00 g (0.016 mole) of α-terthiophene (SYNCOM$_{BV}$) was dissolved in 22 mL of p-dioxane (Burdick & Jackson) and added to a 500 mL round bottom reaction flask. Next, 0.5693 g (0.019 mole) of paraformaldehyde (Eastman Kodak) was added to 17 mL of p-dioxane (Burdick & Jackson) and the mixture was added to the flask. Since the paraformaldehyde did not dissolve in the solvent, 15 mL more of p-dioxane (Eastman Kodak) was used to wash down the aldehyde. Finally, 0.28 mL (0.005 mole) of H2SO4 (Mallinkrodt) was added. The reaction ran for 18 hours at a temperature which stabilized at 86° C. in an argon atmosphere with mechanical stirring. A yellowish-green product was recovered in 500 mL MeOH. A suction filtration was done and the polymer was dried in an oven under vacuum at 35° C. The yield was 64%. The product poly(5,5'',α-terthiophenediyl methylene) (PTTM) had the following structure:

EXAMPLE 18

22 mL of p-dioxane (Burdick & Jackson) was added to a 1000 mL round bottom flask followed by 3.57 mL (0.035 mole) of benzaldehyde (Baker). Next, 0.61 mL (0.011 mole) of $H_2SO_4$ (Mallinkrodt) was added followed by 8.10 g (0.033 mole) of -terthiophene (SYNCOM$_{BV}$). The reaction ran for 23 hours at a stabilized temperature of 84° C. in an argon atmosphere and using a mechanical stirrer. A gelled, dark blue poly(5,5',α-terthiophenediyl benzylidene) was recovered and air dried. It has the following structure:

EXAMPLE 19

Poly(5,5'',α-terthiophenediyl benzylidene) (PTTB) was prepared using the following procedure in which 8.00 g (0.032 mole) of α-terthiophene (SYNCOM$_{BV}$) was dissolved in 37 mL p-dioxane (Burdick & Jackson) and added to a 500 mL round bottom reaction flask. 15 mL of p-dioxane was used to wash it down. Next, 3.56 mL (0.035 mole) of benzaldehyde (Baker) was added and was washed down with 4 mL of p-dioxane. Finally, 0.61 mL (0.011 mole of $H_2SO_4$ (Mallinkrodt) was added. The mixture was reacted as in Example 18 for 6 hours at 82° C. A yellow product was recovered after quenching in 500 mL MeOH. A suction filtration was done and the polymer was allowed to air dry over night. The yield was greater than 82%. The structure was the same as that of Example 18.

EXAMPLE 20

Poly(5,5''α-terthiophenediyl benzylidene) was prepared as in Example 19 except that 45 mL of p-dioxane, 3.9 mL (0.038 mole) benzaldehyde and 4.0 mL of p-dioxane wash were used. The reaction ran for 19.5 hours at 84° C. Part of the polymer had gelled in the bottom of the reaction flask yielding a blue product. The liquid portion of the polymer was quenched in 500 mL MeOH and recovered by suction filtration. The product was dried in an oven under vacuum at 35° C. A yellowish-green product of the same structure as that of Example 18 was obtained.

In Examples 15-20, pure α-terthiophene (2,2',5',2''-terthiophene) synthesized according to the method disclosed by Wynberg and Metselaar in *J. Synth. Commun.*, 1984, 14, pp. 1-9, was obtained from Syncom BV (Groningen, The Netherlands) and used without further purification. Paraformaldehyde (Eastman Kodak), benzaldehyde (Baker), heptaldehyde (Eastman Kodak), para-acetamidobenzaldehyde (Eastman Kodak), sulfuric acid (Mallinkrodt), p-dioxane (Eastman Kodak or Burdick & Jackson) and 99.99% argon (Linde Specialty Gases) were used as received.

The polyterthiophenes containing —$CR_3H$—bridging units illustrated by Examples 15-20 are soluble and are semicrystalline. The polymers exhibit a semiconductor band gap of 1.20-1.24 eV (FIG. 2) and show the long wavelength optical absorption maximum at 857-880 nm, depending on the side group $R_3$. Existence of a planar backbone and hyperconjugation is suggested from the optical absorption results. The results reported in all the examples provide insights to the effects of molecular structure and backbone planarity on the intrinsic electronic and optical properties of polymers in general and the electroactive polymers of the present invention in particular. The new polymers are useful as precursors to conjugated polymers with alternating aromatic and quinonoid sequences in the main chain as well as nonlinear optical materials. The excellent intrinsic electronic properties, for example, the small band gaps also make these electroactive polymers useful in electrochemical applications.

In the preparation of a copolymer of the Structure IB, the chemistry involved is substantially identical to the preparation of the compounds of the Structure IA illustrated in Examples 1-20 except that the starting materials include two hetero-aromatic monomers, dimers or oligomers. These are added in the desired relative proportions and reacted with the desired aldehyde $R_3CHO$. As is the case with the homopolymers, the best results are obtained if the mole ratio of the mixed heterocycles to the aldehyde is 1.0 or less. Any protic acid such as $H_2SO_4$ may be used. The following example illustrates one such preparation.

EXAMPLE 21

Equal molar portions of (0.025 mole) α-terthiophene (SYNCOM$_{BV}$) and (0.025 mole) 2,2'-bithiophene (Eastman Kodak) are added to a round bottom reaction flask containing 0.05 mole of benzaldehyde (Baker) in p-dioxane to which approximately 0.01 mole $H_2SO_4$ has been added. The mixture is reacted at approximately 80° C. for about 24 hours to produce a solid polymer having the structure:

where $Z_1$ and $Z_2$ are integers having a value from about 2 to about 10,000.

Infrared spectra of polymer thin films cast from THF solutions were recorded on KCl windows at room temperature (23° C.) using a Digilab Model FTS-14 Fourier Transform Infrared (FTIR) Spectrometer. Such IR spectra were used to confirm the molecular structures of the polymers.

Optical absorption was done at room temperature (23° C.) in the 183-3200 nm (0.39-6.70 eV) spectra range using a Perkin-Elmer Lambda 9 UV-VIS-NIR spectrophotometer. Thin solid films cast onto sapphire substrates from several solvents including THF, DMF, NMP and $CH_2Cl_2$ were used. Optical absorption spectra of polymer solutions were recorded using 1 cm or 0.5 cm cells.

Thermal analysis, differential scanning calorimetry (DSC) and Thermogravimetric analysis (TGA), was done using a Dupont Model 1090B thermal analyzer and using flowing nitrogen or air atmosphere.

Polymer molecular weight distribution was characterized using a Waters Associate Model 150C gel permeation chromatrograph (GPC) at 60° C. The GPC was packed with $10^5$, $10^4$, $10^3$ and 500 Åultrastyrogel columns in DMF and operated at a flow rate of 0.9 mL/min. Polystyrene standards were used to estimate weight-average and number-average molecular weights. Intrinsic viscosity measurement on solutions of the soluble portions of polymers was done using a Cannon-Ubbelhode suspended level dilution viscometer maintained at 25° C. Intrinsic viscosity was determined by plotting specific viscosity versus concentration and extrapolating to zero concentration. Elemental analysis was performed by Galbraith Laboratories, Inc. (Knoxville, Tenn.)

Figure 1:
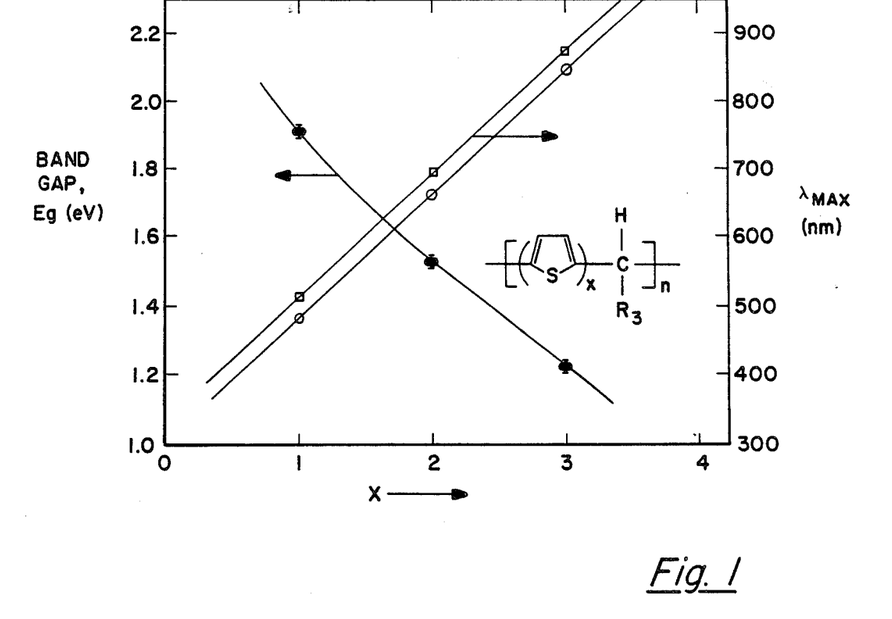
FIG. 1 depicts property tunability of certain of the polymers of the invention.

FIG. 1 shows an example of tunability of intrinsic electronic and optical properties achieved in the present class of electroactive polymers. The band gap is varied over a wide range as the size of the conjugated sections (x) in the backbone is varied. The long-wavelength optical absorption maximum ($\lambda$max) similarly is varied by the value of x as well as by the side chain group ($R_3$).

FIG. 2 further shows tunability of the optical properties of the electroactive polymers of the present invention. The optical properties desired are achieved via control of molecular structure.

TABLE 1

| Polybith-iophene | Molecular Weight Data for Polybithiophenes | | | | |
|---|---|---|---|---|---|
| | $M_w$ | $M_n$ | $M_w/M_n$ | $DP_n$ | $[\eta]$ (dl/g)* |
| PBTB | $1.62 \times 10^6$ | $1.46 \times 10^6$ | 1.11 | 5740 | 0.083 |
| (Ex. 10) | 17,850 | 8,600 | 2.08 | 33.8 | |
| PBTAB | $1.70 \times 10^6$ | $3.91 \times 10^5$ | 4.34 | 1252 | 0.117 |
| (Ex. 11) | 14,220 | 7,680 | 1.85 | 24.6 | |
| PBTM | $4.2 \times 10^6$ | $1.0 \times 10^6$ | 4.15 | 5610 | 0.087 |
| (Ex. 12) | 5,200 | 3,600 | 1.46 | 20.2 | |

$M_w$ = Weight Average Molecular Weight
$M_n$ = Number Average Molecular Weight
$DP_n$ = Degree of Polymerization or Structural "n".
*Intrinsic viscosity data taken in DMF solvent except PBTM data taken in NMP.

The molecular weight distribution and intrinsic viscosity data for the polybithiophenes, for example, are shown in Table 1. Two main molecular weight fractions in each polymer are revealed by the GPC results. In PBTB and PBTM samples the proportion of the high molecular weight fractions is small whereas in PBTAB samples the relative amount of the high molecular weight fraction is more than the low molecular weight fraction. The molecular weight parameters calculated for each molecular weight fraction and polymer are shown in Table 1. The estimated degree of polymerization based on number-average molecular weight ($DP_n$) of the low molecular weight fractions was in the range 20–34 and the high molecular weight fractions 1250–5740. The number of thiophene units in each polymer chain is, thus, twice the degree of polymerization plus the end group units.

The thermal stability of the polymers of Examples 1–20 was determined in nitrogen or air atmosphere. PBTM and PBTB, for example, have onset of decomposition at 400° C. PBTAB, on the other hand, begins to lose weight at 150° C., 14% weight loss is shown between 150° and 300° C. where catastrophic decomposition sets in. It is noteworthy that even at 750° C. all the polybithiophene PBT samples had retained 40–45% of their weight. Thus, in general, all of the polymers of the present invention exhibit excellent thermal stability.

The embodiments of the invention in which an exclusive property or right is claimed are defined as follows:

1. Electroactive polymers of the structure wherein:
X and Y are selected from S, N—H, N-lower alkyl (C=1–7), N-phenyl, O, Se or Te;
$R_1$, $R_2$, $R_4$ and $R_5$ are selected from H and lower alkyls (C=1 to 7);
$R_3$ is selected from the class consisting of aliphatic, aromatic and heterocyclic groups derivable from aldehydes of the formula $R_3CHO$;
x and y are positive integers having a value between 1 and 5;
at least one or both of $Z_1$ and $Z_2$ are positive integers having a value between 1 and 10,000.

2. The electroactive polymers of claim 1 wherein $R_3$ is selected from the group consisting of

H

R', R' = $NO_2$, OH, $CF_3$, F, $OCH_3$, $CH_3$—S—$CH_2$— wherein m is a positive integer having a value from 1 to 8.

3. The electroactive polymers of claim 1 wherein both $Z_1$ and $Z_2$ are positive integers having a value between 1 and 10,000 but wherein both $Z_1$ and $Z_2$ are not 1.

4. The electroactive polymers of claim 2 wherein both $Z_1$ and $Z_2$ are positive integers having a value between 1 and 10,000 but wherein both $Z_1$ and $Z_2$ are not 1.

5. The electroactive polymers of claim 1 wherein X and Y are selected from S, N—H and O.

6. The electroactive polymers of claim 2 wherein X and Y are selected from S, N—H and O.

7. The electroactive polymers of claim 5 wherein X=Y and x=y.

8. The electroactive polymers of claim 6 wherein X=Y and x=y.

9. The electroactive polymers of claim 4 wherein X and Y are S, x=y=2, and $R_1$, $R_2$, $R_4$ and $R_5$=H.

10. The electroactive polymers of claim 4 wherein X and Y are N—H, x=1, y=2 and $R_1$, $R_2$, $R_4$ and $R_5$=H.

11. Electroactive polymers of the structure wherein:
X is selected from S, N—H, N-lower alkyl (C=1-7), N-phenyl, O, Se or Te;
$R_1$ and $R_2$ are selected from H and lower alkyls (C=1-7);
$R_3$ is selected from the class consisting of aliphatic, aromatic and heterocyclic groups derivable from aldehydes of the formula $R_3$CHO;
x is a positive integer having a value from 1 to 5; and
n is a positive integer having a value between 2 and 10,000.

12. The electroactive polymers of claim 11 wherein $R_3$ is selected from the group consisting of $CH_3$―$(CH=CH)_{\overline{z}}$ $$-O-\overset{O}{\underset{\|}{C}}-CH_3, \quad -N(CH_3)_2, \quad -\overset{H}{\underset{|}{N}}-\overset{O}{\underset{\|}{C}}-CH_3$$

$CH_3$―$(CH_2)_{\overline{z}}$ $CH_3$―$S$―$CH_2$― wherein m is a positive integer having a value from 1 to 8.

13. The electroactive polymers of claim 11 wherein X is selected from S, N—H and O.

14. The electroactive polymers of claim 12 wherein X is selected from S, N—H and O.

15. The electroactive polymers of claim 11 where x is a positive integer having a value from 1 to 3.

16. The electroactive polymers of claim 12 where x is a positive integer having a value from 1 to 3.

17. The electroactive polymers of claim 11 wherein $R_1$ and $R_2$ are H.

18. The electroactive polymers of claim 12 wherein $R_1$ and $R_2$ are H.

19. The electroactive polymers of claim 13 wherein X is N—H.

20. The electroactive polymers of claim 14 wherein X is N—H.

21. The electroactive polymers of claim 18 wherein X is N—H.

22. The electroactive polymers of claim 19 wherein x is 1.

23. The electroactive polymers of claim 20 wherein x is 1.

24. The electroactive polymers of claim 21 wherein x is 1.

25. The electroactive polymers of claim 13 wherein X=S.

26. The electroactive polymers of claim 14 wherein X=S.

27. The electroactive polymers of claim 18 wherein X=S.

28. The electroactive polymers of claim 25 wherein x=1.

29. The electroactive polymers of claim 26 wherein x=1.

30. The electroactive polymers of claim 27 wherein x=1.

31. The electroactive polymers of claim 25 wherein x=2.

32. The electroactive polymers of claim 26 wherein x=2.

33. The electroactive polymers of claim 27 wherein x=2.

34. The electroactive polymers of claim 25 wherein x=3.

35. The electroactive polymers of claim 26 wherein x=3.

36. The electroactive polymers of claim 27 wherein x=3.

37. The electroactive polymers of claim 13 wherein X=O.

38. The electroactive polymers of claim 14 wherein X=O.

39. The electroactive polymers of claim 18 wherein X=O.

40. The electroactive polymers of claim 37 where x=1.

41. The electroactive polymers of claim 38 where x=1.

42. The electroactive polymers of claim 39 where x=1.

43. The electroactive polymers of claim 4 wherein x and Y are S; x=2, y=3; and $R_1$, $R_2$, $R_4$ and $R_5$=H.

44. The electroactive polymer of claim 43 wherein $R_3$ is a phenyl group.

* * * * *